Sept. 11, 1956 W. G. MAUCH 2,762,276
SPREADER FOR ROAD SURFACING MATERIALS
Filed April 17, 1953 3 Sheets-Sheet 1
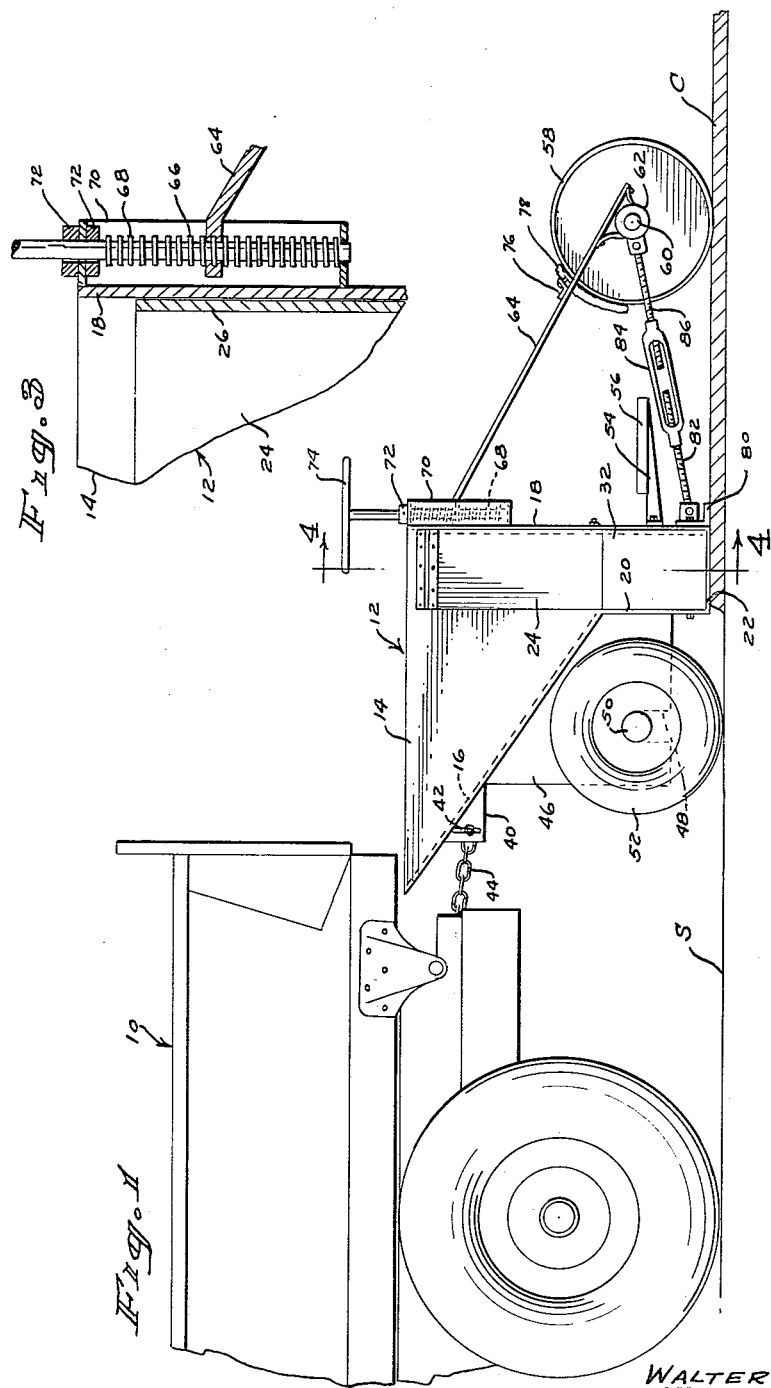
INVENTOR.
WALTER G. MAUCH
BY
McMorrow, Berman + Davidson
ATTORNEYS.

Sept. 11, 1956 W. G. MAUCH 2,762,276
SPREADER FOR ROAD SURFACING MATERIALS
Filed April 17, 1953 3 Sheets-Sheet 2
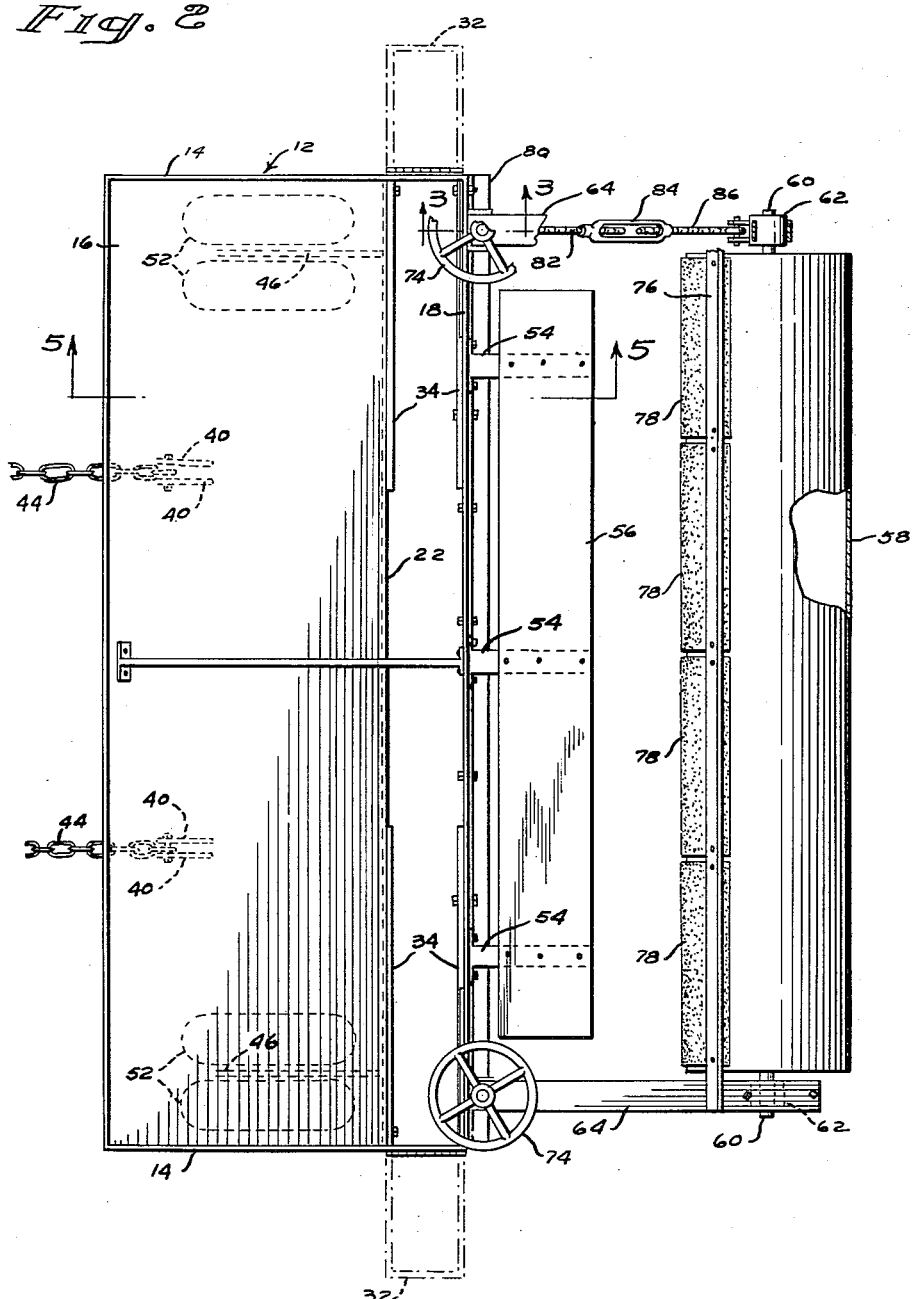
INVENTOR.
WALTER G. MAUCH
BY
McMorrow, Berman + Davidson
ATTORNEYS Sept. 11, 1956 W. G. MAUCH 2,762,276
SPREADER FOR ROAD SURFACING MATERIALS
Filed April 17, 1953 3 Sheets-Sheet 3
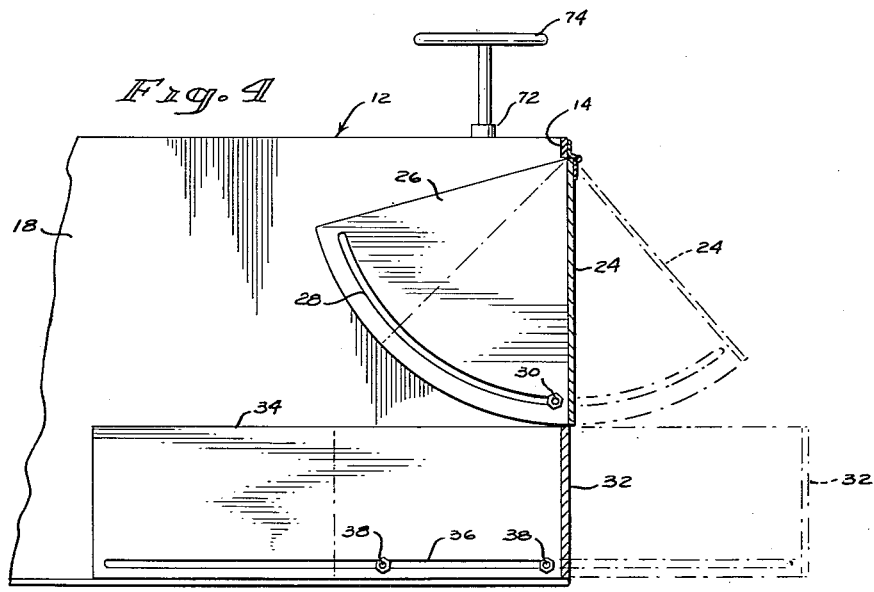
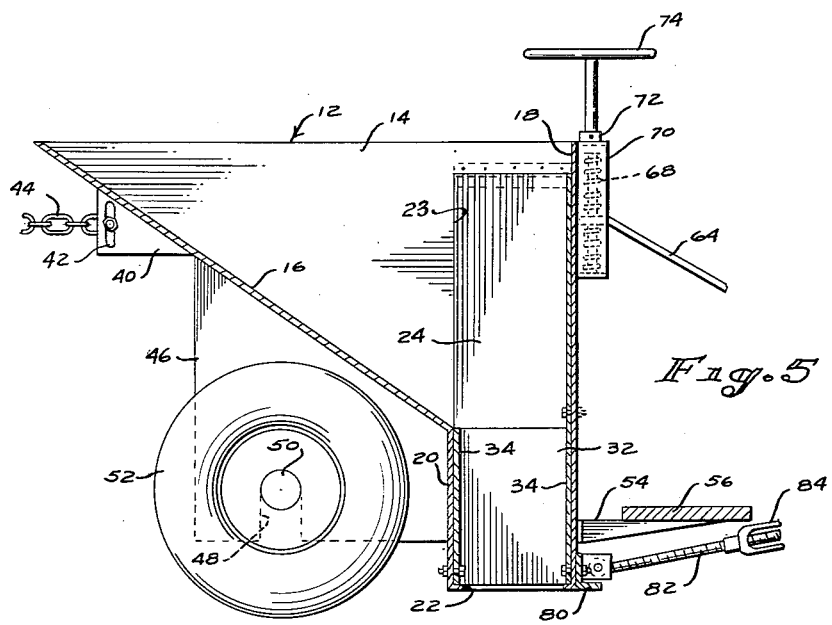
INVENTOR.
WALTER G. MAUCH
BY
McMorrow, Berman + Davidson
ATTORNEYS

United States Patent Office 2,762,276
Patented Sept. 11, 1956

2,762,276

SPREADER FOR ROAD SURFACING MATERIALS

Walter G. Mauch, Cornelius, Oreg.

Application April 17, 1953, Serial No. 349,401

2 Claims. (Cl. 94—44)

This invention relates to an improved wheeled spreader for asphaltic, cementitious, or other materials used in road surfacing operations.

One important object is to provide a spreader of the type stated which is designed to be drawn by a tractor vehicle such as a truck, with minimum loss of time.

Another object of importance is to provide a spreader as stated which is designed as to cause the surfacing materials to be applied and rolled more closely to curbings, buildings, or other vertical barriers.

Another object is to provide a spreader as stated including a hopper having at its opposite sides open-bottomed extensions arranged to be adjusted laterally outwardly of the hopper, so as to increase the length of the transversely extending discharge slot or opening of the hopper.

Another object is to provide, in said hopper, hinged doors which when swung outwardly will permit material to flow into the extensions, the doors serving as deflectors for guiding the material.

Still another object is to provide, in a spreader as described, rolling means mounted upon the hopper for vertical adjustment so as to adjust the hopper to selected elevations above the road surface to be covered, thereby to permit the application of surfacing materials differing from one another in respect to the extent to which they are compressible on the road surface.

Still another object is to provide a spreader of the character indicated above which is light in weight, portable, simple in construction, and adapted for manufacture from relatively inexpensive parts.

Other objects will appear from the following description, the claims appended thereto, and from the annexed drawings, in which like reference characters designate like parts throughout the several views, and wherein:

Figure 1 is a side elevational view of a spreader formed in accordance with the present invention, a truck to which said spreader is attached being illustrated fragmentarily and in side elevation;

Figure 2 is a top plan view of the spreader per se, in which portions have been broken away, the dotted lines indicating positions to which the hopper extensions can be adjusted outwardly of the hopper;

Figure 3 is an enlarged, detail sectional view on line 3—3 of Figure 2, showing a vertically adjustable connection of a roller support member to the hopper;

Figure 4 is an enlarged, fragmentary, transverse sectional view on line 4—4 of Figure 1, the dotted lines indicating outwardly adjusted positions of the extensions and hinged deflector means; and Figure 5 is a sectional view on line 5—5 of Figure 2.

The illustrated spreader designated generally by the reference numeral 12 comprises a hopper fully open at its top, to permit material to be readily transferred from a tractor truck 10 to said hopper. The hopper 12 is transversely elongated, rectangular in form and has vertically disposed side walls 14, having rearwardly declining lower edges between which extends a correspondingly declining front wall 16. The declining front wall, as will be readily apparent from Figures 1 and 5, causes material fed into the hopper to be directed rearwardly toward the vertically disposed, transversely extending rear wall 18 of the hopper. The wall 18, like the front wall 16, is rigid at its opposite ends with the side walls 14, and as will be noted from Figure 5, the lower end portion of the rear wall 18 extends downwardly a substantial distance below the level of the rear lower edge of the front wall 16, said lower edge of the front wall being spaced forwardly from the rear wall 18.

Rigid with the rear edge of front wall 16 is a depending, vertically disposed bottom wall extension 20, and between the bottom edges of rear wall 18 and front wall extension 20 there is defined a transversely elongated discharge slot 22 extending from one side wall 14 to the other. Road surfacing material within the hopper gravitate through the discharge slot, throughout the width of the hopper 12, and are applied uniformly to a road surface S to provide a covering C for said surface.

Means is incorporated in the hopper for extending the length of the discharge slot 22, beyond the opposite side walls 14, thereby to increase the width of the covering C. To this end, in each side wall 14, adjacent the rear wall 18, there is formed a rectangular opening 23 normally covered by a hinged door 24. Each door 24 is hinged at its upper edge to the side wall above the opening 23 for swinging movement about a horizontal axis between the full line and dotted line positions shown in Figure 4. When swung outwardly, each door 24 declines outwardly from the related side wall 14, to provide a deflector for material flowing through the related opening 23.

Secured to the rear edge of each door 24 is a segmentally shaped wing 26, slidably contacting the forward surface of the rear wall 18 and having, along its lower edge, an arcuate slot 28 concentric with the hinge axis of the door. A pin 30 fixed on the rear wall 18 extends through the slot 28, to guide the door 24 in its swinging movement. When the door 24 has been swung to a selected position, a nut threaded upon the pin 30 can be tightened against the door to clamp the door in the selected position.

Below the doors 24 are box-like extensions 32 which are located adjacent the slot 22 below the doors 24. Each extension 32 has an open bottom, throughout its length, and vertically disposed, parallel front and rear walls 34 and 35 formed, along their lower edges, with elongated, longitudinal slots 36. Guide pins 38 extend from the rear wall 18 and from the front wall extension 20 through the slots 36, whereby the extensions 32 are slidably mounted upon the hopper for adjustment laterally inwardly and outwardly of the hopper side walls 14, between the full line and dotted line positions shown in Figure 4. The extensions have side walls 33 at their laterally outwardly ends.

When the extensions 32 are slidably adjusted to their extended dotted line positions, they serve to extend the length of the hopper discharge opening 22. The doors 24, when swung outwardly, serve to deflect road surfacing material into the outwardly adjusted extensions.

The means for attaching the spreader to the truck 10 includes transversely spaced pairs of triangular plates 40, the plates of each pair having transversely aligned, vertically disposed slots 42 receiving a pin to which is attached the rear end of a chain 44. Chains 44 are attached to the truck 10 in any suitable manner.

Secured to and depending from the hopper bottom wall 16 near the sides of the hopper are vertical depending plates 46 having in their lower edges downwardly opening slots 48 receiving axles 50 to which are attached, at opposite sides of the plates, ground wheels 52. The hopper can, of course, be lifted completely off the supporting wheel assemblies, when not in use.

It is preferred that means be provided upon the spreader for supporting a worker, in a position where he will be able to observe the flow of material from the hopper and distribute material evenly within the hopper. To this end, platform support brackets 54 are bolted to and extend rearwardly from the lower end portion of rear wall 18, and a transversely extending platform 56 is secured upon said brackets.

In trailing relation to the hopper 12 is a roller 58 which can be of hollow formation, and can be readily manufactured from sheet metal material or the like. Roller 58 is parallel to the discharge slot 22, and at its opposite ends, has trunnions 60 journaled in bearings 62 disposed below and secured to the rear ends of rearwardly declining roller support arms 64, secured at their forward elevated ends to the rear hopper wall 18 at opposite ends of said rear wall.

The elevated forward ends of the arms 64 are connected to the hopper for vertical adjustment relative thereto, as shown in Figure 3. The forward end of each arm 64 is formed with a threaded opening 66 in which is engaged a vertical adjusting screw 68 rotatably mounted at its upper and lower ends in smooth walled openings formed in a bracket 70 secured to the rear side of the rear wall 18. Collars 72, circumposed on and fixed to the shank 69 on the upper end of the screw 68, contact the top and bottom surfaces of the upper end 71 of the bracket 70, to hold the screw against vertical movement during rotation thereof.

The upper end of the shank 69 of each screw 68 is fitted with a hand wheel 74 readily accessible to the worker standing on platform 56, and on rotation of the hand wheel 74, the forward ends of the arms 64 will be adjusted upwardly or downwardly relative to the hopper, as may be desired.

Secured fixedly at its ends to and extending transversely between the rear end portions of the arms 64 is an angle iron mat support bar 76, which serves also to transversely reinforce the roller support assembly. Carried by the bar 76 is a longitudinal series of coco mats 78, having wiping contact with the surface of roller 58, to keep said roller clean during a surfacing operation.

Bracing the hopper 12 transversely thereof, and secured to the rear side of the hopper rear wall 18 at the lower edge of the rear wall is an angle iron reinforcing bar 80. Secured to the opposite ends of the bar 80 are pivot brackets, to which the forward ends of threaded rods 82 are horizontally pivoted. Threaded on the rear ends of said rods 82 are turn buckles 89 having threaded engagement, at their rear ends, with rods 86. The rods 86 are threaded oppositely to the rods 82, and are pivotally secured at their rear ends to the roller supporting bearings 62 on the lower ends of the arms 64.

Assuming that it is desired that the roller 58 be adjusted upwardly from the position thereof shown in Figure 1, it is merely necessary that the turn buckle assembly be extended to a selected extent, and the screws 68 operated to elevate the upper ends of the arms 64.

It is believed apparent that the invention is not necessarily confined to the specific use or uses thereof described above, since it may be utilized for any purpose to which it may be suited. Nor is the invention to be necessarily limited to the specific construction that is illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a spreader for road surfacing material, a hopper having spaced vertical side walls, a rearwardly declining front wall having a rear edge, said front wall extending between the side walls, a depending front wall extension on the said rear edge of the front wall having a lower edge, and a vertical rear wall extending between said side walls, said rear wall having a lower edge on a level with the lower edge of said front wall extension, said side walls having lower edges on a level with the lower edges of said rear wall and said front wall extension, the space at and between the lower edges of the front wall extension of the side walls, and of the rear wall defining a material discharge slot, said side walls having openings reaching upwardly from the lower edges of the side walls, said openings having upper edges, depending deflector plates having upper ends hinged horizontally to the side walls at the upper edges of the openings, said deflector plates normally being substantially flush with the side walls in closing relation to upper portions of said openings, said plates having lower edges spaced upwardly from the lower edges of the side walls, said deflector plates being arranged to be swung laterally outwardly from their normal positions to deflecting positions, means acting between the deflector plates and the hopper for holding the deflector plates in selected positions, box-like hopper extensions each consisting of spaced front and rear walls having inner and outer ends and an end wall extending between the outer ends of said front and rear walls, said hopper extensions being positioned endwise through the lower portions of the hopper side wall openings below the deflector plates between the bottom wall extension and the rear hopper wall, and means embodying guide pins projecting from said hopper rear wall and said hopper front wall extension and extending slidably through longitudinal slots formed in the front and rear walls of said extension mounting said extensions on the hopper for endwise movements in opposite directions from unextended positions to extended positions laterally outwardly of the hopper side walls, with the deflector plates in deflecting positions.

2. In a spreader for road surfacing material, a hopper having spaced vertical side walls, a rearwardly declining front wall having a rear edge, said front wall extending between the side walls, a depending front wall extension on the said rear edge of the front wall having a lower edge, and a vertical rear wall extending between said side walls, said rear wall having a lower edge on a level with the lower edge of said front wall extension, said side walls having lower edges on a level with the lower edges of said rear wall and said front wall extension, the space at and between the lower edges of the front wall extension of the side walls, and of the rear wall defining a material discharge slot, said side walls having openings reaching upwardly from the lower edges of the side walls, said openings having upper edges, depending deflector plates having upper ends hinged horizontally to the side walls at the upper edges of the openings, said deflector plates normally being substantially flush with the side walls in closing relation to upper portions of said openings, said plates having lower edges spaced upwardly from the lower edges of the side walls, said deflector plates being arranged to be swung laterally outwardly from their normal positions to deflecting positions, means acting between the deflector plates and the hopper for holding the deflector plates in selected positions, box-like hopper extensions each consisting of spaced front and rear walls having inner and outer ends and an end wall extending between the outer ends of said front and rear walls, said hopper extensions being positioned endwise through the lower portions of the hopper side wall openings below the deflector plates between the bottom wall extension and the rear hopper wall, and means embodying guide pins projecting from said hopper rear wall and said hopper front wall extension and extending slidably through longitudinal slots formed in the front and rear walls of said extension mounting said extensions on the hopper for endwise movements in opposite directions from unextended positions to extended positions laterally outwardly of the hopper side walls, with the deflector plates in deflecting positions, and a surface roller assembly mounted on and in trailing relation to said hopper rear wall.

References Cited in the file of this patent

UNITED STATES PATENTS

| | | |
|---|---|---|
| 1,429,144 | Jones | Sept. 12, 1922 |
| 1,522,382 | Pain | Jan. 6, 1925 |
| 1,581,784 | Butler | Apr. 20, 1926 |
| 2,258,205 | Halvorson | Oct. 7, 1941 |
| 2,590,443 | Miller | Mar. 25, 1952 |
| 2,645,986 | Rasmussen | July 21, 1953 |